US009563252B2

(12) United States Patent
Choi

(10) Patent No.: US 9,563,252 B2
(45) Date of Patent: Feb. 7, 2017

(54) DISPLAY APPARATUS AND DISPLAY METHOD THEREOF

(71) Applicant: SAMSUNG ELECTRONICS CO., LTD., Suwon-si (KR)

(72) Inventor: Hyun-seok Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/468,534

(22) Filed: Aug. 26, 2014

(65) Prior Publication Data
US 2015/0195595 A1    Jul. 9, 2015

(30) Foreign Application Priority Data

Jan. 9, 2014    (KR) .................. 10-2014-0002824

(51) Int. Cl.
| | |
|---|---|
| *H04H 60/33* | (2008.01) |
| *G06F 1/32* | (2006.01) |
| *H04N 7/16* | (2011.01) |
| *H04N 21/4223* | (2011.01) |
| *G06K 9/00* | (2006.01) |
| *H04N 21/4415* | (2011.01) |
| *H04N 21/431* | (2011.01) |

(52) U.S. Cl.
CPC .......... *G06F 1/3231* (2013.01); *G06K 9/00288* (2013.01); *H04N 7/163* (2013.01); *H04N 21/4223* (2013.01); *H04N 21/431* (2013.01); *H04N 21/4415* (2013.01)

(58) Field of Classification Search
CPC ...................... H04N 21/4223; H04N 21/44218

USPC ................................................. 725/9, 10, 12
See application file for complete search history.

(56) References Cited

U.S. PATENT DOCUMENTS

| | | | |
|---|---|---|---|
| 2003/0103030 A1* | 6/2003 | Wu ................... | G06K 9/00013 345/102 |
| 2009/0285454 A1 | 11/2009 | Xu | |
| 2012/0054634 A1 | 3/2012 | Stone et al. | |
| 2013/0179698 A1* | 7/2013 | Woods et al. ................ | 713/300 |
| 2013/0329966 A1* | 12/2013 | Hildreth ....................... | 382/115 |
| 2014/0176798 A1* | 6/2014 | Tanaka ............... | H04N 21/4318 348/570 |
| 2014/0253700 A1* | 9/2014 | Hirano ........................... | 348/61 |

(Continued)

FOREIGN PATENT DOCUMENTS

EP    2490151 A1    8/2012

OTHER PUBLICATIONS

Communication dated May 11, 2015 issued by the European Patent Office in counterpart Application No. 14197789.2.

*Primary Examiner* — Kyu Chae
(74) *Attorney, Agent, or Firm* — Sughrue Mion, PLLC

(57) ABSTRACT

A method for displaying of a display apparatus is provided. The display method includes in response to a first command being input, photographing a user and generating first recognition information; associating the first recognition information with information on a screen displayed when the first command is input and storing the associated information in the display apparatus; in response to a second command being input, photographing a user and generating second recognition information; and comparing the first recognition information and the second recognition information and determining whether to display content based on a result of the comparison.

18 Claims, 11 Drawing Sheets

(56) References Cited

U.S. PATENT DOCUMENTS

2015/0074695 A1* 3/2015 Chuang et al. ................ 725/11
2015/0128160 A1* 5/2015 Benea et al. .................... 725/12

* cited by examiner

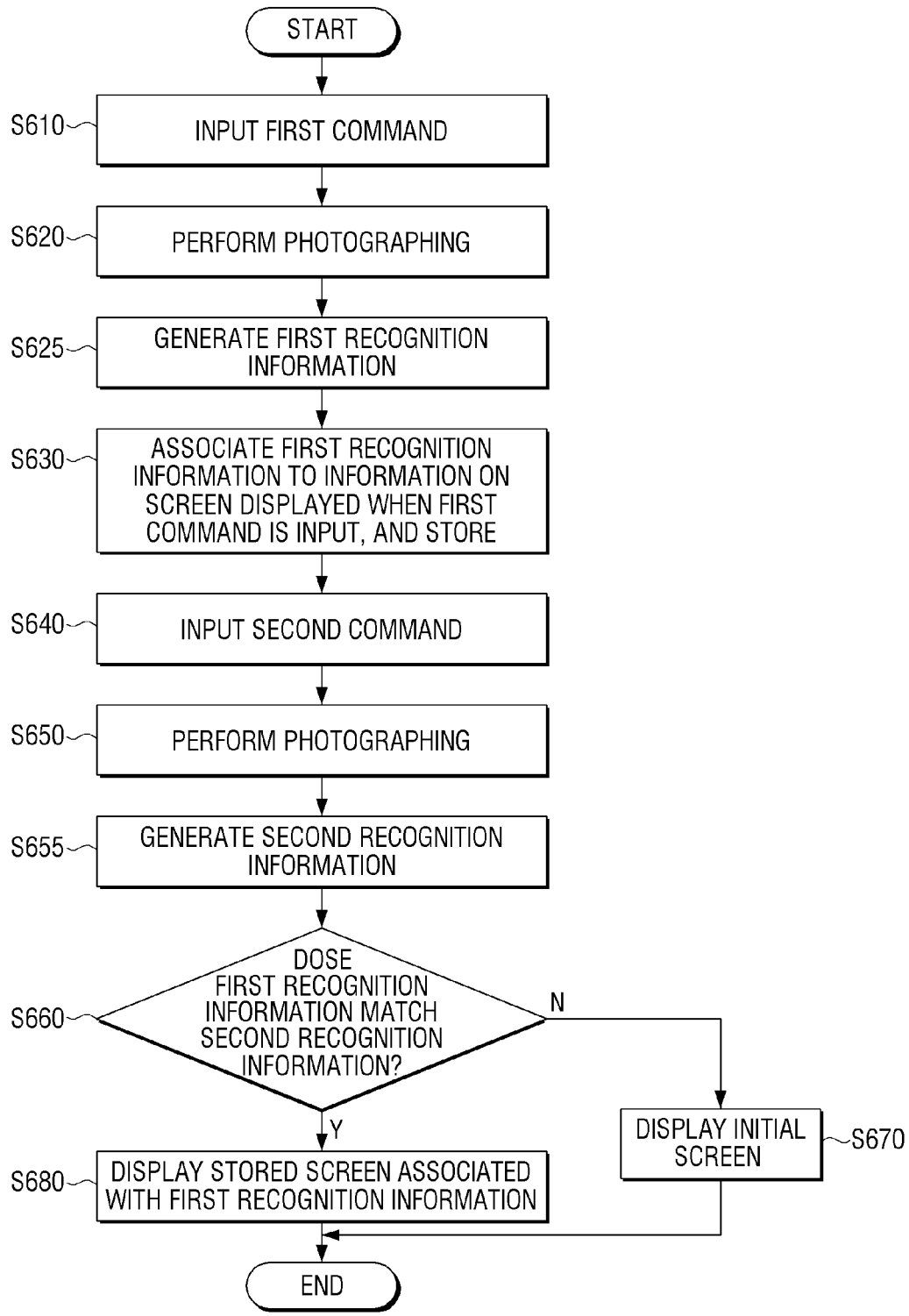

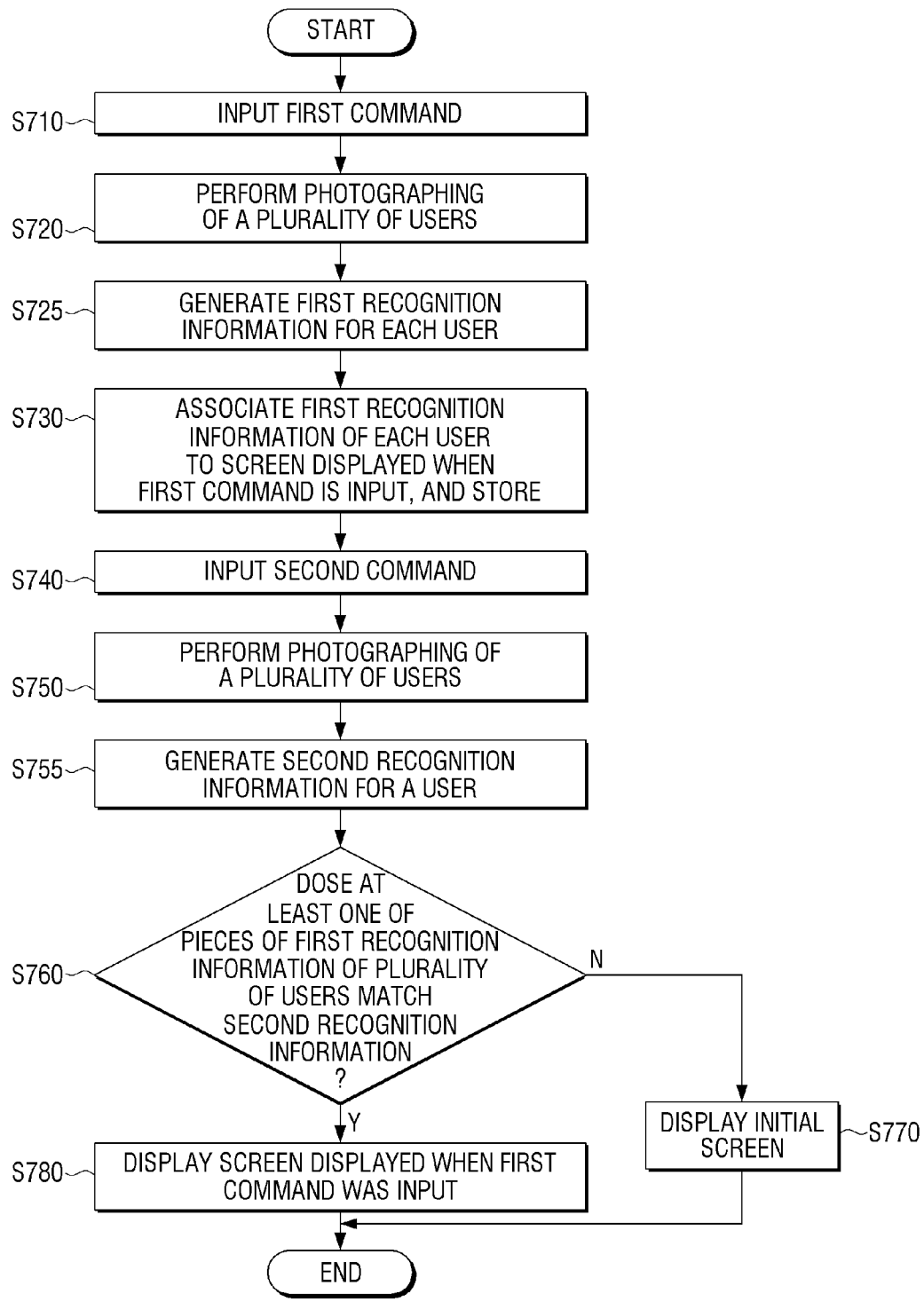

DISPLAY APPARATUS AND DISPLAY METHOD THEREOF

CROSS-REFERENCE TO RELATED APPLICATION(S)

This application claims priority from Korean Patent Application No. 10-2014-0002824, filed on Jan. 9, 2014 in the Korean Intellectual Property Office, the entire disclosure of which is hereby incorporated by reference.

BACKGROUND

1. Field

Apparatuses and methods consistent with exemplary embodiments relate to a display apparatus and a display method thereof, and more particularly, to a display apparatus which provides a content screen by authenticating a user and a display method thereof.

2. Description of the Related Art

With the development of electronic technology, technology for providing lots of contents using various kinds of display apparatuses is developing. In particular, the television (TV) is the most commonly used display apparatus in general households and TVs that can provide various contents based on communication with users. For example, an Internet Protocol Television (IPTV) or a Digital TV (DTV) are in the spotlight in recent years.

Such a TV is not a personal apparatus and is generally shared by a family or a plurality of users. Therefore, a service for providing contents and information customized for each user through a single apparatus has appeared.

A related-art user authentication method for providing such a customized service is inputting a password. However, this method has a disadvantage in that it requires the user to input the user's password every time that the user is authenticated, which causes inconvenience to the user.

SUMMARY

One or more exemplary embodiments may overcome the above disadvantages and other disadvantages not described above. However, it is understood that one or more exemplary embodiment are not required to overcome the disadvantages described above, and may not overcome any of the disadvantages described above.

One or more exemplary embodiments provide a display apparatus which automatically authenticates a user and provides a content screen, and a display method thereof.

According to an aspect of an exemplary embodiment, there is provided a method for displaying information on a display apparatus, the method comprising in response to a first command being input, photographing a user and generating first recognition information; associating the first recognition information with information on a screen displayed when the first command is input and storing the associated information in the display apparatus; in response to a second command being input, photographing a user and generating second recognition information; and comparing the first recognition information and the second recognition information and determining whether to display content based on a result of the comparison.

The determining may comprise, when the first recognition information matches the second recognition information, displaying the screen displayed when the first command was input, and, when the first recognition information does not match the second recognition information, displaying a screen that is different from the screen displayed when the first command was input.

The first command may be a power off command, and the second command may be a power on command.

The photographing of the user in response to the first command being input may comprise photographing a plurality of users, and the generating the first recognition information may comprise generating a plurality of pieces of first recognition information, each piece of first recognition information corresponding to one of the plurality of users. The determining may comprise, when at least one of the pieces of first recognition information matches the second recognition information, displaying the screen displayed when the first command was input.

The photographing of the user in response to the second command being input may comprise photographing a plurality of users, and the generating the second recognition information may comprise generating a plurality of pieces of second recognition information, each piece of second recognition information corresponding to one of the plurality of users, and the determining may comprise, when the pieces of first recognition information match the pieces of second recognition information for all of the plurality of users, displaying the screen displayed when the first command was input.

The first command and the second command may be commands generated by pressing a button on a remote controller for controlling the display apparatus.

The first recognition information and the second recognition information may be image information that is obtained by photographing a face of the user.

The storing may comprise updating the stored information on the screen that has been associated with the first recognition information every time the first command is input, and storing the updated information.

The information on the screen may be information on a channel which is being watched, information on an application which is being executed, or information on an operation mode of the display apparatus.

According to another aspect of an exemplary embodiment, there is provided a display apparatus comprising a display configured to display image data; a photographer configured to photograph a user; a storage; an inputter configured to receive a user command to control the display apparatus; and a controller configured to, in response to a first command being input through the inputter, control the photographer to photograph a user using the photographer and generate first recognition information, and control the storage to associate the first recognition information with information on a screen displayed when the first command is input and store the associated information in the display apparatus; and configured to, in response to a second command being input through the inputter, control the photographer to photograph a user using the photographer and generate second recognition information, compare the first recognition information and the second recognition information, and determine whether to display content based on a result of the comparison.

When the first recognition information matches the second recognition information, the controller may display the screen displayed when the first command was input, and, when the first recognition information does not match the second recognition information, the controller may display a screen which is different than the screen displayed when the first command was input.

The first command may be a power off command, and the second command may be a power on command.

In response to the first command being input, the controller may control the photographer to photograph a plurality of users, generate a plurality of pieces of first recognition information, each piece of first recognition information corresponding to one of the plurality of users, and, when at least one of the pieces of first recognition information matches the second recognition information, the controller may control the display to display the screen displayed when the first command was input.

In response to the second command being input, the controller may control the photographer to photograph a plurality of users; generate a plurality of pieces of second recognition information, each piece of second recognition information corresponding to one of the plurality of users, and, when the pieces of first recognition information match the pieces of second recognition information for all of the plurality of users, the controller may control the display to display the screen displayed when the first command was input.

The first command and the second command may be commands generated by pressing a button on a remote controller for controlling the display apparatus.

The first recognition information and the second recognition information may be image information that is obtained by photographing a face of the user.

The controller may update the stored information on the screen that has been associated with the first recognition information every time the first command is input, and store the updated information.

The information on the screen may be information on a channel which is being watched, information on an application which is being executed, or information on an operation mode of the display apparatus.

According to another aspect of an exemplary embodiment, there is provided a method comprising, in response to receiving a first command at a display apparatus, capturing a physical feature of a user; and generating first recognition information from the captured physical feature; storing, in the display apparatus, the first recognition information in association with a state of the display apparatus, wherein the state of the display apparatus is a state of the display apparatus at a time the first command is received; and in response to receiving a second command at the display apparatus, capturing a physical feature of a user; and generating second recognition information from the captured physical feature; comparing the stored first recognition information with the generated second recognition information; and determining whether to return to the state associated with the first recognition information based on a result of the comparison.

The state of the display apparatus may be a screen which is being displayed, a channel which is being watched, a state of an application which is being executed, or an operation mode in which the display apparatus is being operated.

BRIEF DESCRIPTION OF THE DRAWINGS

The above and/or other aspects will be more apparent by describing in detail exemplary embodiments, with reference to the accompanying drawings, in which:

FIGS. 6 and 7 are flowcharts to illustrate a display method of a display apparatus according to various exemplary embodiments.

DETAILED DESCRIPTION

Figure 1:
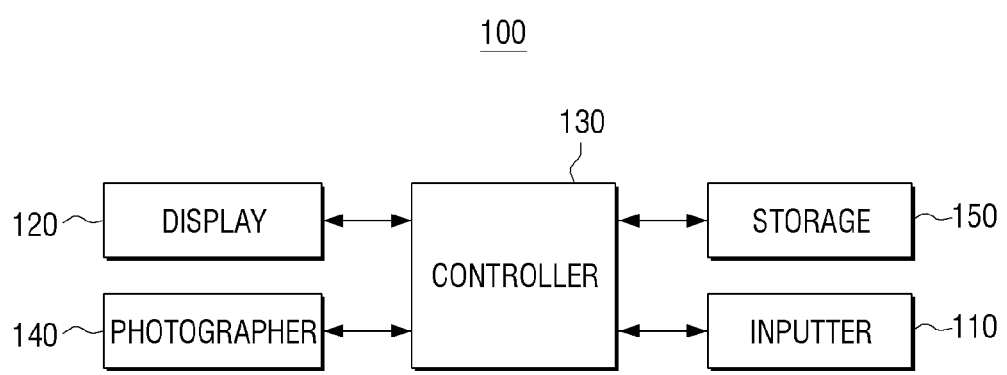
FIG. 1 is a block diagram schematically illustrating a configuration of a display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram schematically illustrating a configuration of a display apparatus according to an exemplary embodiment. Referring to FIG. 1, a display apparatus 100 includes an inputter 110, a display 120, a controller 130, a photographer 140, and a storage 150. The display apparatus 100 according to an exemplary embodiment may be a TV. However, this is merely an example and the display apparatus 100 may be implemented by using various kinds of display apparatus such as a smartphone, a tablet PC, a desktop PC, a monitor, a projector, etc.

The inputter 110 is configured to receive a user command to control the display apparatus 100. For example, the inputter 110 may be a remote controller of a TV. In particular, when the inputter 110 is a remote controller to control the display apparatus 100, a user command of pressing a specific button on the remote controller may be a first command or a second command. The first command or second command is input by pressing the specific button on the remote controller, and an operation of the controller 130 is performed. The specific button may be predetermined. The operation of the controller 130 will be explained in detail below.

The display 120 is configured to display a screen including at least one object. The screen recited herein refers to an image frame that is provided through the display 120 of the display apparatus 100. Specifically, the screen may include a home screen, an icon screen, a list screen, an application execution screen, a web browser screen, a content playback screen, etc. The screen may indicate a state of the display apparatus. In addition, the object recited herein may include various kinds of shapes displayed on the screen such as an icon, a text, a photo, a widget, etc. The display 120 displays video data under the control of the controller 130.

The photographer 140 is configured to photograph a user of the display apparatus 100, and receives a video signal (for example, a frame) generated by photographing the user and transmits the video signal to the controller 130. According to an exemplary embodiment, the photographer 140 may be implemented by using a camera which includes a lens and an image sensor. In this case, an image photographed by the photographer 140 may be transmitted to the controller 130 and the controller 130 may recognize the user by detecting a specific part from the image. Specifically, any part of a user's body that can identify the user, such as a user's face, a distinct part of the user's face (for example, an eye, a nose, a lip, etc.), or an iris part of the user's eye, may be a target to be detected.

The storage 150 is configured to store various programs or data used in the display apparatus 100. In particular, the storage 150 may update the screen that has been matched with first recognition information and stored, and store the updated screen every time that the first command is input through the inputter 110.

The controller 130 is configured to control an overall operation of the display apparatus 100. The controller 130 may be, for example, a microprocessor, or a plurality of microprocessors. In response to the first command being input through the inputter 110, the controller 130 controls the photographer 140 to photograph a user using the photographer 140 and generates first recognition information, and controls the storage 150 to match the first recognition information with information on the screen currently displayed when the first command is input. In this case, the information on the screen may be one of information on a channel which is being watched, information on an application which is being executed, and information on an operation mode of the display apparatus 100.

In addition, in response to the second command being input through the inputter 110, the controller 130 controls the photographer 140 to photograph a user using the photographer 140, and generates second recognition information, compares the first recognition information and the second recognition information, and determines whether to display content by using the information on the screen stored in the storage 150. The content may be predetermined. In this case, the screen on which the content is displayed may be the same screen as the screen displayed when the first command was input, or may be a screen pre-set by the user. Alternatively, the screen on which the content is displayed may be a screen customized to suit a user's tastes. For example, the display apparatus 100 may set the operation mode such as brightness, an aspect ratio, an icon display location, etc., for each user. The operation mode set for each user may be applied to the display apparatus 100 based on user recognition information.

Specifically, when the first recognition information and the second recognition information are determined to match each other, the controller 130 may control the display 120 to display the screen that had been displayed when the first command was input. For example, the first recognition information and the second recognition information may be determined as matching each other when they are identical. Alternatively, the first recognition information and the second recognition information may be determined as matching when they match within a threshold amount, for example, 90%. However, when the first recognition information and the second recognition do not match each other, the controller 130 may control the display 120 to display a new screen. The new screen is not particularly limited as long as the screen is different from the screen that had been displayed when the first command was input. For example, the new screen may be a default screen or other screen.

According to an exemplary embodiment, in response to a first command to turn off the display apparatus 100 being input, the controller 130 recognizes the user when the display apparatus 100 is turned off and generates first recognition information, and controls the storage 150 to associate the first recognition information with a last screen displayed on the display 120 when the display apparatus 100 is turned off and store the associated information. In addition, in response to a second command to turn on the display apparatus 100, the controller 130 generates second recognition information, compares the first recognition information previously stored and the second recognition information, and, when the first recognition information and the second recognition information match each other, controls the display 120 to display the last screen which was associated with the first recognition information and stored. As described above, the first command or second command may be a command of pressing a power button on the remote controller for controlling the display apparatus 100. According to the above-described exemplary embodiment, the user who used the display apparatus 100 when the display apparatus 100 was turned off can be automatically provided with the screen that the user has viewed before when the display apparatus 100 is turned on again. Therefore, the user can continuously use the content without performing an extra input to be authenticated.

According to another exemplary embodiment, the first command may be a command to change a mode of the display apparatus 100 to a standby mode, and the second command may be a command to change the standby mode back to an activation mode. The standby mode refers to a state in which power supply to the display 120 is temporarily shut off in order to save power consumption of the display 120 or in order to secure the content displayed through the display 120. In response to the first command to change the mode to the standby mode being input, the controller 130 controls the photographer 140 to photograph the user when the mode is changed to the standby mode and generates first recognition information, and associates the first recognition information with the screen displayed on the display 120 when the mode is changed to the standby mode. In response to the second command to change the standby mode to the activation mode being input, the controller 130 controls the photographer 140 to photograph the user when the standby mode is changed to the activation mode and generates second recognition information. The subsequent operations may accord with the above-described exemplary embodiment and thus not be described again.

According to another exemplary embodiment, when the display apparatus 100 is implemented by using an apparatus including a plurality of terminals, the first command or second command may be a command to change a terminal connection. Specifically, the plurality of terminals may be a High Definition Multimedia Interface (HDMI) terminal, a Digital Visual Interface (DVI) terminal, a digital broadcast receiving terminal, or a Universal Serial Bus (USB) terminal. For example, in response to the first command to change the USB terminal to the digital broadcast receiving terminal being input while the display apparatus 100 is outputting video data through the USB terminal, the controller 130 controls the photographer 140 to photograph the user when the terminal is changed and generates first recognition information, and associates the first recognition information with the screen output when the first command is input and stores the associated information in the storage 150. In response to the second command to change the digital broadcast receiving terminal back to the USB terminal being input by the same user, the controller 130 controls the photographer 140 to photograph the same user and generates second recognition information. When it is determined that the second recognition information matches the stored first recognition information, the controller 150 may control the display 120 to receive the video data from the terminal when the first command was input and output the video data.

Hereinafter, the operation of the controller 130 when a plurality of users are photographed in response to the first command or second command being input will be explained.

When the plurality of users are photographed in response to the first command being input, the controller 130 may generate the first recognition information on each of the plurality of users. When at least one of the pieces of first recognition information on the plurality of users matches the second recognition information, the controller 130 may control the display 120 to display the screen displayed when the first command was input. For example, the display apparatus 100 may be implemented by using a TV. In this case, a plurality of users may use the TV at the same time due to the characteristic of the TV. Therefore, the controller 130 generates the first recognition information on each of the plurality of users and determines whether at least one of the pieces of first recognition information matches the second recognition information. Exemplary embodiments regarding this example will be explained below with reference to FIGS. 4A and 4B.

In addition, when a plurality of users are photographed in response to the second command being input, the controller 130 generates the second recognition information on each of the plurality of users. Only when all of the pieces of second recognition information match corresponding ones of all of the pieces of first recognition information, the controller 130 may control the display 120 to display the screen displayed when the first command was input. Exemplary embodiments regarding this example will be explained below with reference to FIGS. 5A to 5C.

Although the controller 130 obtains the recognition information by photographing the user using the photographer 140 in the above-described exemplary embodiments, the controller 130 may obtain the recognition information by recognizing a user's voice. In this case, the storage 150 may store a text conversion module to convert the user's voice into text and the controller 130 may convert the input user voice into text through the text conversion module. The text conversion module may convert the recognized voice into text by using at least one of various recognition algorithms such as a dynamic time warping method, a hidden Markov model, a neural network, etc. For example, when the hidden Markov model is used, the text conversion module may model a temporal change and a spectrum change of the user voice and detect a similar word from a pre-stored language database. Accordingly, the text conversion module may output the detected word as a text.

As described above, in response to a specific command being input, the display apparatus 100 can automatically perform user authentication without receiving an extra input, such as the input of a password, to authenticate the user, and thus users can be provided with contents or information customized to each user.

Figure 2:
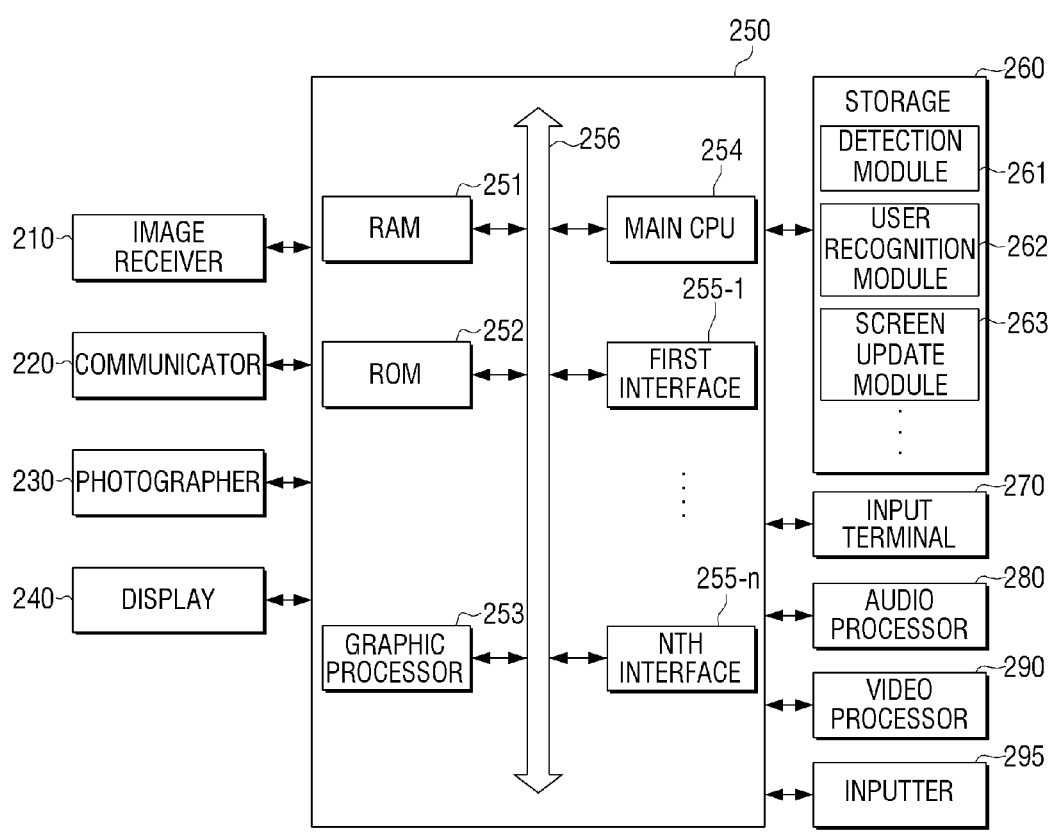
FIG. 2 is a block diagram illustrating a configuration of a display apparatus in detail according to an exemplary embodiment.

FIG. 2 is a block diagram illustrating a configuration of a display apparatus in detail according to an exemplary embodiment. Referring to FIG. 2, a display apparatus 100 includes an image receiver 210, a communicator 220, a photographer 230, a display 240, a controller 250, a storage 260, an input terminal 270, an audio processor 280, a video processor 290, and an inputter 195.

FIG. 2 illustrates the respective elements of the display apparatus 100 when the display apparatus 100 is equipped with various functions such as a communication function, an image receiving function, a display function, etc., for example. Accordingly, some of the elements illustrated in FIG. 2 may be omitted or changed or another element may be added.

The image receiver 210 receives image data from various sources. For example, the image receiver 210 may receive broadcasting data from an external broadcasting station, may receive image data from an external apparatus (for example, a Digital Versatile Disk (DVD), a Blu-ray Disk player, etc.), and/or may receive image data stored in the storage 150.

The communicator 220 is a communication interface configured to communicate with various kinds of external apparatuses and/or external servers according to various kinds of communication methods. The communicator 220 may include various communication chips such as a Wi-Fi chip, a Bluetooth chip, a Near Field Communication (NFC) chip, a wireless communication chip, etc. The Wi-Fi chip, the Bluetooth chip, and the NFC chip perform communication in a Wi-Fi method, a Bluetooth method, and an NFC method, respectively. Among these, the NFC chip is operated in the NFC method, which uses a band of 13.56 MHz from among various RF-ID frequency bands such as 135 kHz, 13.56 MHz, 433 MHz, 860~960 MHz, and/or 2.45 GHz. When the Wi-Fi chip or the Bluetooth chip is used, a variety of connection information such as an SSID and a session key is exchanged first and connection is established using the connection information, and then, a variety of information is exchanged. The wireless communication chip refers to a chip that performs communication according to various communication standards such as IEEE, Zigbee, $3^{rd}$ generation (3G), $3^{rd}$ Generation Partnership Project (3GPP), and Long Term Evolution (LTE).

The display 240 displays at least one of a video frame which is a result of processing image data received from the image receiver 210 by the video processor 290, and various screens which are generated by a graphic processor 253. The display 240 displays image data under the control of the controller 250.

The storage 260 stores various modules for driving the display apparatus 100. For example, the storage 260 may store software including a base module, a sensing module, a communication module, a presentation module, a web browser module, and a service module which, when executed by the controller 250, performs various functions. In this case, the base module refers to a module which processes signals transmitted from each piece of hardware included in the display apparatus 100 and transmits the signals to an upper layer module. The sensing module is a module which collects information from various sensors, and analyzes and manages the collected information. For example, the sensing module may include a face recognition module, a voice recognition module, a motion recognition module, and an NFC recognition module. The presentation module is a module which generates a display screen, and includes a multimedia module to reproduce multimedia contents and output the multimedia contents, and a user interface (UI) rendering module to process a UI and graphics. The communication module is a module for communicating with an external apparatus. The web browser module is a module for performing web browsing and accessing a web server. The service module is a module including various applications for providing various services. The storage 260 may store a detection module 261, which when executed by the controller 250 operates various components to detect a part of the user's body from the image photographed by the photographer 230, a user recognition module 262, which when executed by the controller 250 operates various components to recognize the user based on the detected recognition object, and a screen update module 263, which when executed by the controller 250 operates various components to update the pre-stored screen every time the first command is input. The above-described control modules may be implemented by using software stored in the storage 260 or may be implemented by using separate hardware.

The storage 260 may, in conjunction with the controller 250, associate the first recognition information which is generated by photographing the user in response to the first command being input with the screen displayed when the first command is input, and may store the associated information. Although the first recognition information and the screen displayed when the first command is input are stored in the storage 260 in the above-described exemplary embodiment, this is merely an example. The above information may be stored in an external apparatus connected through a network.

The audio processor 280 is an element for processing audio data. The audio processor 280 may include one or more microprocessors and may perform various processing operations such as decoding, amplification, noise filtering, etc. with respect to the audio data.

The video processor 290 is an element for processing image data received at the image receiver 210. The video processor 290 may include one or more microprocessors and may perform various image processing operations such as decoding, scaling, noise filtering, frame rate conversion, resolution conversion, etc. with respect to the image data.

The inputter 295 is an element for receiving a user command to control an overall operation of the display apparatus 100. For example, the inputter 295 may be implemented by using various input devices such as a remote controller, a pointing device, a motion sensor for sensing a user's motion, a voice sensor for sensing a user's voice, a mouse, etc.

The controller 250 may include one or more microprocessors and controls the overall operation of the display apparatus 100 by executing various programs stored in the storage 260.

As shown in FIG. 2, the controller 250 includes a Random Access Memory (RAM) 251, a Read Only Memory (ROM) 252, a graphic processor 253, a main central processing unit (CPU) 254, first to nth interfaces 255-1~255-n, and a bus 256. The RAM 251, the ROM 252, the graphic processor 253, the main CPU 254, and the first to the nth interfaces 255-1~255-n may be connected to one another through the bus 256.

The ROM 252 stores a set of commands to boot the system. When a turn on command is input and power is supplied, the main CPU 254 copies an operating system (O/S) stored in the storage 260 into the RAM 251 according to a command stored in the ROM 252, executes the O/S and boots the system. When the booting is completed, the main CPU 254 copies the various application programs stored in the storage 260 into the RAM 131, executes the application programs copied into the RAM 251, and performs various operations.

The graphic processor 253 generates a screen including various objects such as an icon, an image, and text using a calculator (not shown) and a renderer (not shown). The calculator calculates attribute values of each object to be displayed, such as coordinates values, a shape, a size, and a color, according to a layout of the screen using the control command received from the inputter 295. The renderer generates a screen of various layouts including objects based on the attribute values calculated by the calculator. The screen generated by the renderer is displayed on a display area of the display 240.

For example, the main CPU 254 copies the detection module 261, the user recognition module 262, and the screen update module 263 stored in the storage 260 into the RAM 251, and may selectively execute the modules. Accordingly, the main CPU 254 may detect a part of an image photographed by the photographer 230 to recognize the user from the image photographed by the photographer 230 and may recognize the user based on the detected part. According to another exemplary embodiment, when a plurality of users are included in the received image, the main CPU 254 may detect the respective users' faces and may generate recognition information on each of the users. In addition, the main CPU 254 associates the screen displayed when the first command is input with each user when time the first command is input, and stores the associated information, so that the pre-stored screen can be updated.

The first to nth interfaces 255-1 to 255-n are connected with the above-described elements. One of the interfaces may be a network interface connected with an external apparatus through a network.

In particular, in response to the first command being input through the inputter 295, the controller 250 controls the photographer 230 to photograph the user using the photographer 230 and generates the first recognition information, and controls the storage 260 to associate the first recognition information with the screen displayed when the first command is input and store the associated information. In addition, in response to the second command being input through the inputter 295, the controller 250 controls the photographer 230 to photograph the user using the photographer 230 and generates the second recognition information, and determines whether to display the screen displayed when the first command was input by comparing the first recognition information and the second recognition information.

The operation of the controller 250 will be explained in detail with reference to FIGS. 3A to 5C.

Figure 3A:
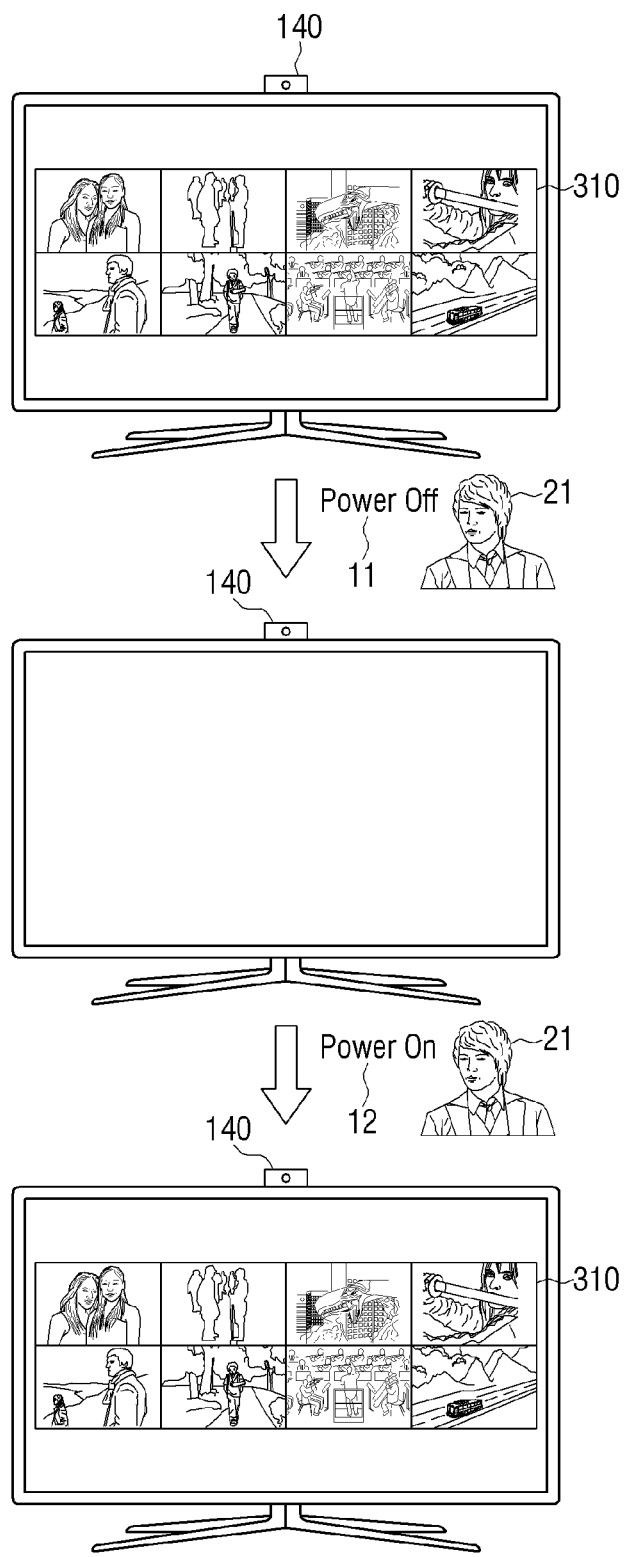
FIGS. 3A to 5C are views to illustrate an operation of a display apparatus according to various exemplary embodiments.

Referring to FIG. 1 and FIG. 3A, according to an exemplary embodiment, in response to a first command 11 to turn off power of the display apparatus 100 being input, the controller 130 of the display apparatus 100 controls the photographer 140 to photograph a first user 21 and generates first recognition information, and controls the storage 150 to associate the first recognition information with a last screen 310 displayed when the first command 11 is input and store the associated information. Thereafter, in response to a second command 12 to turn on the power of the display apparatus 100 being input, the controller 130 controls the photographer 140 to photograph the first user 21 and generates second recognition information. The controller 130 compares the first recognition information and the second recognition information. When the user at the time the second command 12 is input matches the user at the time the first command 11 was input, the controller 130 controls the display 120 to display the pre-stored screen 310 again.

Figure 3B:
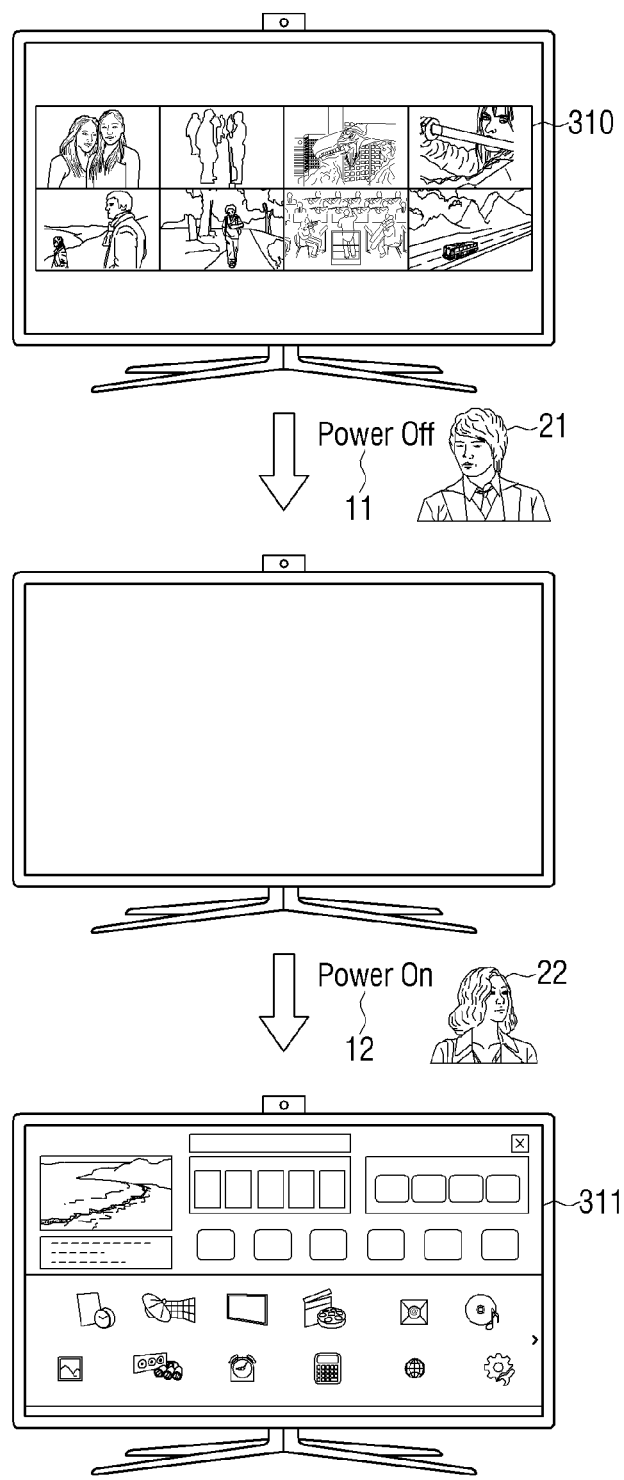

Referring to FIG. 1 and FIG. 3B, in response to the first command to turn off the power of the display apparatus 100 being input, the controller 130 of the display apparatus 100 controls the photographer 140 to photograph the first user 21 and generates the first recognition information, and controls the storage 150 to associate the first recognition information with the last screen 310 displayed when the first command 11 is input and store the associated information. Thereafter, in response to the second command 12 to turn on the power of the display apparatus 100 being input, the controller 130 controls the photographer 140 to photograph a second user 22 and generates second recognition information. The controller 130 compares the first recognition information and the second recognition information. In this case, when the user at the time the second command 12 is input does not match the user when the first command 11 was input, the controller 130 controls the display 120 to display a new screen 311 other than the screen 310 displayed when the first command 11 was input. However, in the case that there is a screen that has been associated with the second recognition information of the second user 22 and stored before the second command 12 is input, the new screen 311 is the screen that has been matched with the second recognition information of the second user 22 and stored, and, where there is no screen that has been previously matched with the second recognition information of the second user 22 and stored, the new screen 311 may be an initial screen of the display apparatus 100. Alternatively, the new screen 311 may be a default screen set in the preferences of the display apparatus 100.

Figure 4A:
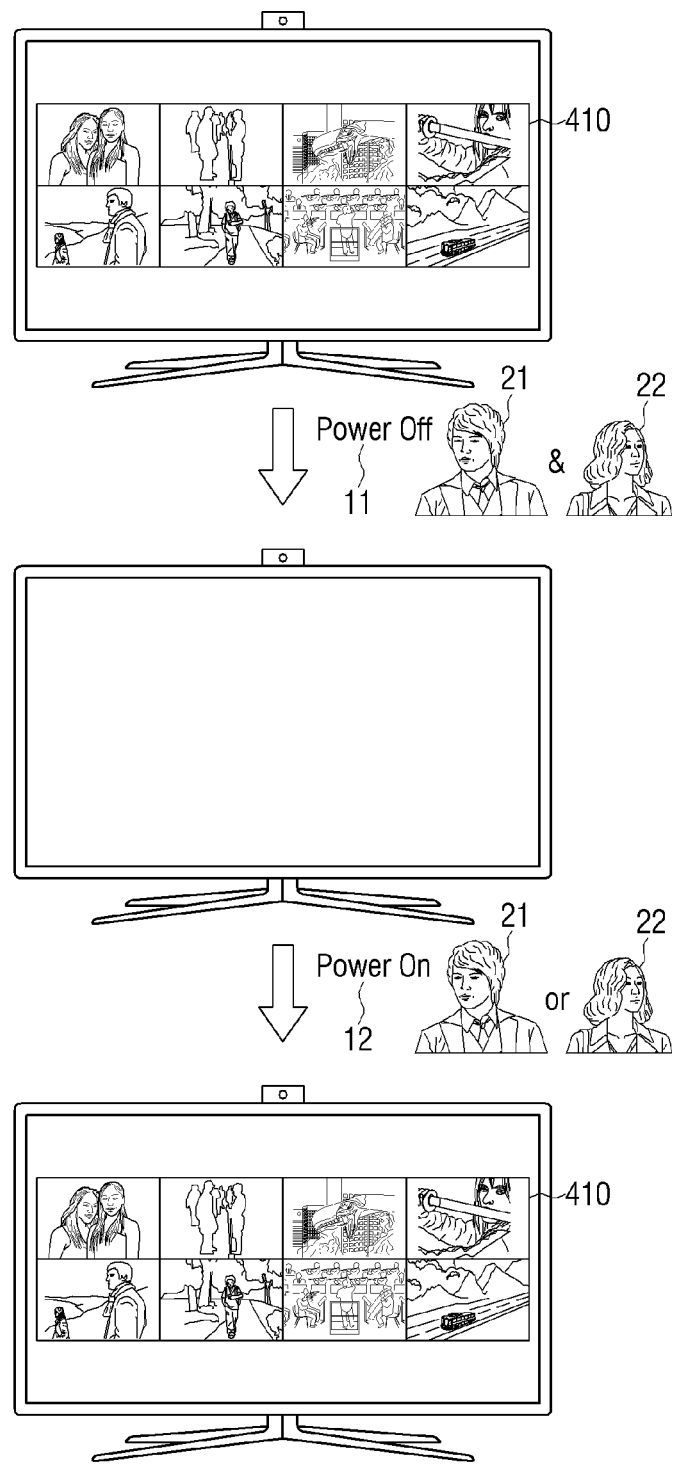

FIG. 4A is a view to illustrate an exemplary embodiment in which a plurality of users are recognized in response to a first command being input. Referring to FIG. 4A, in response to a first command to turn off the power of the display apparatus 100, the controller 130 of the display apparatus 100 controls the photographer 140 to photograph a first user 21 and a second user 22 and generates first recognition information on each of the first user 21 and the second user 22, and controls the storage 150 to associate the first recognition information of each user with a last screen 410 displayed when the first command 11 is input and store the associated information. Thereafter, in response to a second command 12 to turn on the power of the display apparatus 100, the controller 130 controls the photographer 140 to photograph the first user 21 (or the second user 22) and generates second recognition information. The controller 130 compares the first recognition information and the second recognition information, and, when at least one of the users at the time the first command 11 was input matches the user at the time the second command 12 is input, the controller 130 controls the display 120 to display the stored screen 410.

Figure 4B:
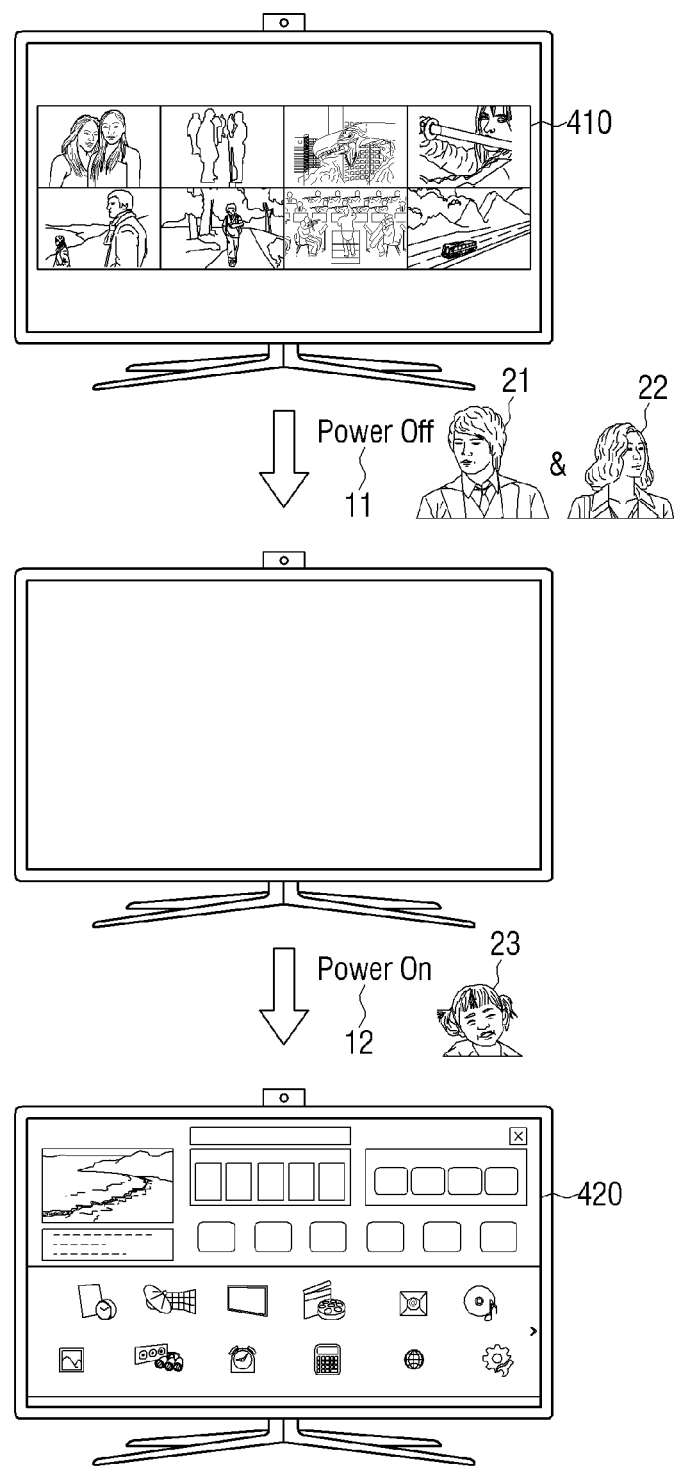

Referring to FIG. 4B, in response to the first command to turn off the power of the display apparatus 100 being input, the controller 130 of the display apparatus 100 controls the photographer 140 to photograph the first user 21 and the second user 22 and generates the first recognition information on each of the first user 21 and the second user 22, and controls the storage 150 to associate the first recognition information with the last screen 410 when the first command 11 is input and store the associated information. Thereafter, in response to the second command 12 to turn on the power of the display apparatus 100, the controller 130 controls the photographer 140 to photograph a third user 23 and generates second recognition information. The controller 130 compares the first recognition information and the second recognition information, and, when the user at the time the second command 12 is input does not match any of the users when the first command 11 was input, the controller 130 controls the display 120 to display a new screen 420 other than the screen 410 displayed when the first command 11 was input. As discussed above, when there is a screen that has been previously associated with the recognition information of the third user 23 and stored before the second command 12 is input, a new screen 420 is displayed which is the screen that has been previously associated with the recognition information of the third user 23 and stored, and, where there is no screen that has been associated with the recognition information of the third user 23 and stored, the new screen 420 may be the initial screen of the display apparatus 100. The new screen 420 may be a default screen.

Figure 5A:
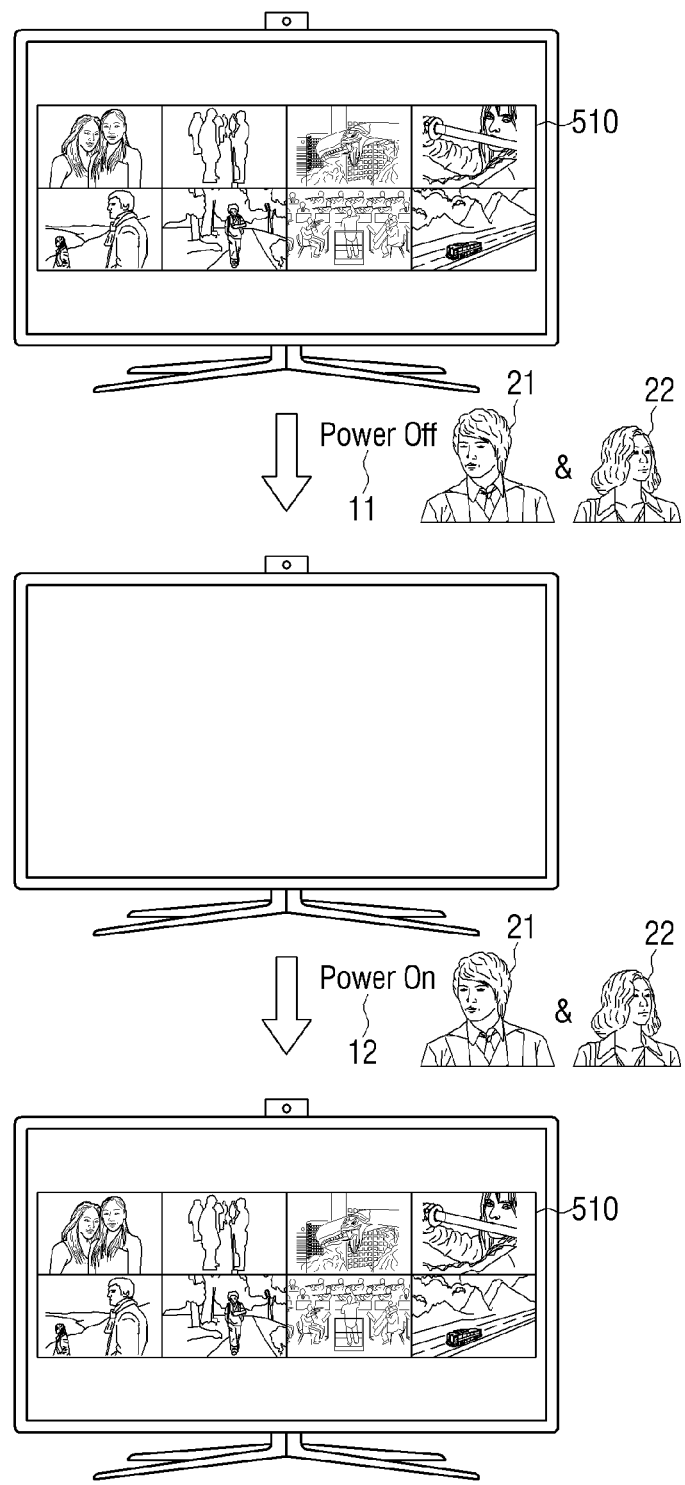

FIG. 5A is a view to illustrate an exemplary embodiment in which a plurality of users are photographed in response to a second command 12 being input. Referring to FIG. 5A, in response to a first command 11 to turn off the power of the display apparatus 100, the controller 130 of the display apparatus 100 controls the photographer 140 to photograph the first user 21 and the second user 22 and generates first recognition information on each of the first user 21 and the second user 22, and controls the storage 150 to associate the first recognition information for each user with a last screen 510 displayed when the first command 11 is input and store the associated information. Thereafter, in response to a second command 12 to turn on the power of the display apparatus 100 being input, the controller 130 controls the photographer 140 to photograph the first user 21 and the second user 22 and generates second recognition information on each of the first user 21 and the second user 22. The controller 130 compares the first recognition information and the second recognition information. When all of the users at the time the first command 11 was input match all of the users at the time the second command 12 is input, the controller 130 controls the display 120 to display the stored screen 510.

Figure 5B:
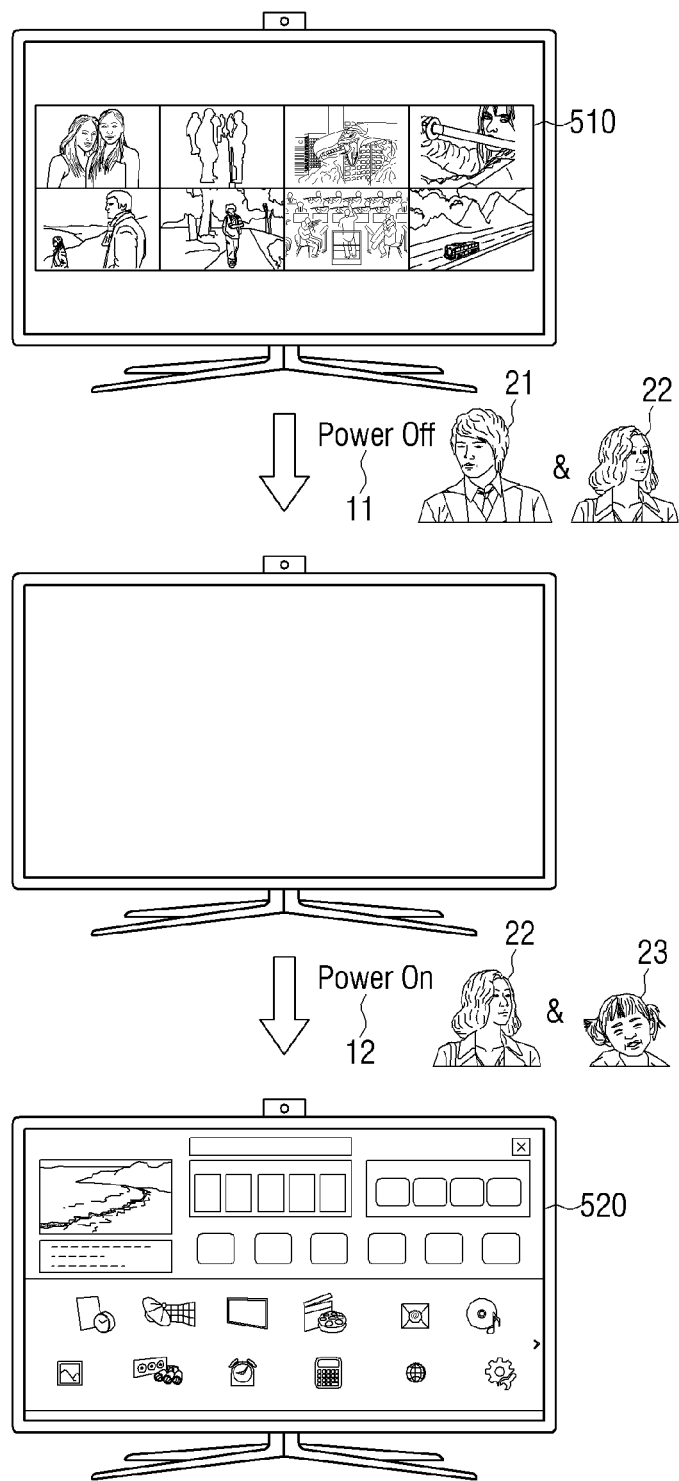

Referring to FIG. 5B, in response to the first command to turn off the power of the display apparatus 100 being input, the controller 130 of the display apparatus 100 controls the photographer 140 to photograph the first user 21 and the second user 22 and generates the first recognition information on each of the first user 21 and the second user 22, and controls the storage 150 to associate the first recognition information of each user with the last screen 510 displayed when the first command 11 is input and store the associated information. Thereafter, in response to the second command 12 to turn on the power of the display apparatus 100 being input, the controller 130 controls the photographer 140 to photograph the second user 22 and a third user 23 and generates second information on each of the second user 22 and the third user 23. The controller 130 compares the first recognition information and the second recognition information. When the users at the time the first command 11 was input do not match the users when the second command 12 is input, the controller 130 controls the display 120 to display a new screen 520 other than the screen 510 displayed when the first command 11 was input. In this case, the new screen 520 may be the initial screen of the display apparatus 100. The new screen 520 may be a default screen.

Figure 5C:
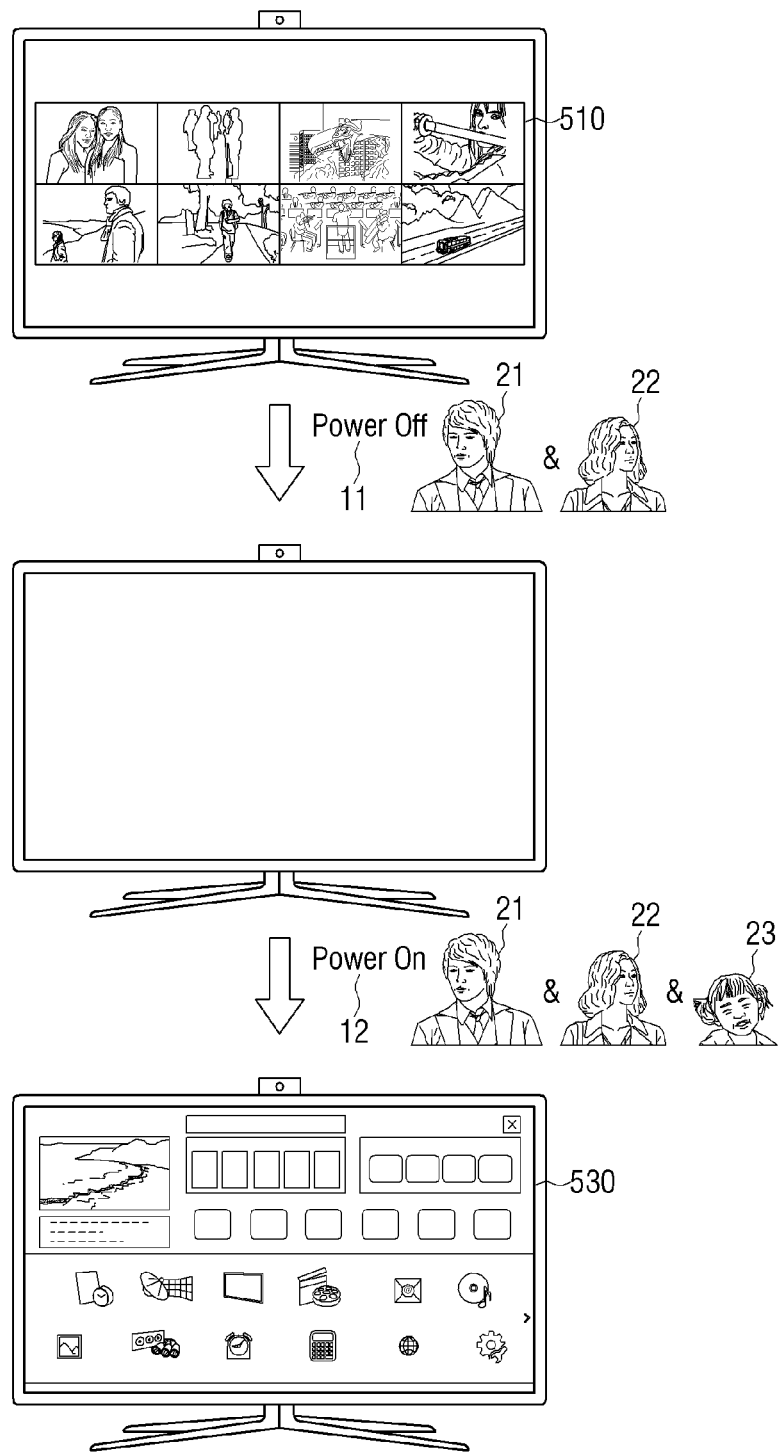

Referring to FIG. 5C, in response to the first command to turn off the power of the display apparatus 100 being input, the controller 130 of the display apparatus 100 controls the photographer 140 to photograph the first user 21 and the second user 22 and generates the first recognition information on each of the first user 21 and the second user 22, and controls the storage 150 to associate the first recognition information of each user with the last screen 510 displayed when the first command 11 is input and store the associated information. Thereafter, in response to the second command 12 to turn on the power of the display apparatus 100 being input, the controller 130 controls the photographer 140 to photograph the first user 21, the second user 22, and the third user 23 and generates the second information on each of the first user 21, the second user 22, and the third user 23. The controller 130 compares the first recognition information and the second recognition information. When all of the users at the time the first command 11 was input do not match all of the users when the second command 12 is input, the controller 130 controls the display 120 to display the new screen 520 other than the screen 510 displayed when the first command 11 was input. The new screen 520 may be a default screen. That is, even when the users when the first command 11 was input are included in the users when the second command 12 is input, the screen 510 displayed when the first command 11 was input is not displayed. In this case, the new screen 520 may be the initial screen of the display apparatus 100. The new screen 520 may be a default screen.

According to the display method of the display apparatus described above, the user does not worry about that the use history of the content or information that the user has viewed through the display apparatus 100 is exposed to other users.

Hereinafter, a display method of a display apparatus according to various exemplary embodiments will be explained with reference to FIGS. 6 and 7.

FIG. 6 is a flowchart illustrating a display method of a display apparatus according to an exemplary embodiment.

The display apparatus 100 receives a first command (S610). The first command may be a command to turn off the power of the display apparatus 100, a command to change a mode of the display apparatus 100 to a standby mode, or a command to change a connection of a terminal through which the display apparatus 100 receives video data, etc.

The display apparatus 100 performs photographing (S620). The photographing may be performed by a photographing apparatus attached to the display apparatus 100 or may be performed by an external photographing apparatus communicatively coupled to the display apparatus 100. Through such an apparatus, a user of the display apparatus 100 when the first command is input is photographed. In this case, photographing the user may be photographing a user's specific body part, for example, may be obtaining an image on a user's face, a specific part of the face, user's iris, user's fingerprint, etc.

The display apparatus 100 generates first recognition information (S625), and associates the first recognition information with information on a screen displayed when the first command is input and stores the associated information (5630). The information on the screen may be one of information on a channel which is being watched, information on an application which is being executed, and/or information of an operation mode of the display apparatus 100, etc.

The first recognition information may include user recognition information. The display apparatus 100 may use a pre-stored user database to generate the first recognition information. Specifically, the display apparatus 100 may analyze the photographed image and recognize the user corresponding to the result of the analyzing by scanning the database. When the user is a new user that has not been stored in the user database, the display apparatus 100 may add the newly photographed user to the user database based on the result of the analyzing of the photographed image. As described above, the first recognition information including the user information is associated with the screen displayed when the first command is input and stored, so that the associated and stored screen can be displayed again when a second command is input afterward.

The display apparatus 100 receives an input of a second command (S640). The second command may be a command to turn on the power of the display apparatus, a command to change the standby mode of the display apparatus back to an activation mode, or a command to change the connection of the terminal through which the display apparatus receives the video data, etc.

The display apparatus 100 performs photographing (S650). In the same way as in response to the first command being input, the display apparatus 100 photographs the user who uses the display apparatus when the second command is input.

The display apparatus 100 generates second recognition information (S655) based on the photographed image, and determines whether the first recognition information and the second recognition information match each other by comparing the first recognition information and the second recognition information (S660).

When the first recognition information and the second recognition information do not match each other (S660, N), the display apparatus 100 displays an initial screen (S670). The initial screen refers to a screen that is generally displayed first in response to the display apparatus 100 being turned on. The initial screen may be a default screen.

When the first recognition information and the second recognition information match each other (S660, Y), the display apparatus 100 displays the stored screen associated with the first recognition information (S680). Alternatively, the display apparatus 100 may display predetermined content based on the stored screen associated with the first recognition information. For example, the predetermined content may customized to suit user's tastes. For example, the predetermined content may be a screen that is customized to suit the user's tastes or may be an operation mode of the display apparatus 100, such as brightness, an aspect ratio, an icon display location, etc., set for each user. The operation mode set for each user may be applied to the display apparatus 100 based on the user recognition information.

In addition to the exemplary embodiment of the operations explained above with reference to FIG. 6, another exemplary embodiment may be derived by adding and supplementing with various operations explained above with reference to FIGS. 1 to 5C.

FIG. 7 is a flowchart illustrating a display method of a display apparatus according to another exemplary embodiment.

The display apparatus 100 receives a first command (S710). The first command may be a command to turn off the power of the display apparatus 100, a command to change the mode of the display apparatus 100 to the standby mode, or a command to change the connection of the terminal through which the display apparatus 100 receives video data, etc.

The display apparatus 100 performs photographing of a plurality of users (S720). The photographing may be performed by a photographing apparatus attached to the display apparatus 100 or may be performed by an external photographing apparatus communicatively coupled to the display apparatus 100. Through such an apparatus, a user of the display apparatus when the first command is input is photographed. In this case, photographing the users may be photographing a specific body part of each user, for example, an image on a user's face, a specific part of the face, user's iris, user's fingerprint, etc. In particular, a single image may be generated by photographing the plurality of users or images may be generated as many as the number of users by photographing the users.

The display apparatus 100 generates first recognition information on each of the plurality of users (S725), and associates the first recognition information of each user with a screen displayed when the first command is input and stores the associated information (S730). The first recognition information may include user recognition information. In order to generate the first recognition information, the display apparatus may use a pre-stored user database. Specifically, the display apparatus 100 may analyze the photographed image and recognize the users corresponding to the result of the analyzing by scanning the database. When the user is a new user that has not been stored in the user database, the display apparatus may add the newly photographed user to the user database based on the result of the analyzing of the photographed image. As described above, the first recognition information including the user information of each user is associated with the screen displayed when the first command is input and stored, so that the associated and stored screen can be displayed again when a second command is input afterward. In particular, when the plurality of users are included in a single image, the image may be analyzed by detecting each user part. As a result, the first recognition information is generated as many as the number of users. In this case, each piece of first recognition information is associated with the screen displayed when the first command is input and stored.

The display apparatus 100 receives a second command (S740). The second command may be a command to turn on the power of the display apparatus, a command to change the standby mode of the display apparatus back to the activation mode, or a command to change the connection of the terminal through which the display apparatus receives the video data, etc.

The display apparatus 100 performs photographing of a user (S750). In the same way as in response to the first command being input, the display apparatus 100 photographs the user who uses the display apparatus 100 when the second command is input. As described above, when there are a plurality of users when the second command is input, a single image of the plurality of users may be generated or images may be generated as many as the number of users by photographing each of the users.

The display apparatus 100 generates second recognition information (S755) based on the photographed image, and determines whether at least one of the pieces of first recognition information on the plurality of users matches the second recognition information by comparing the first recognition information and the second recognition information (S760). When none of the pieces of the first recognition information matches the second recognition information (S760, N), an initial screen is displayed (S770). The initial screen may be a default screen. When at least one of the pieces of first recognition information matches the second recognition information, the screen displayed when the first command was input is displayed again (S780). The initial screen refers to a screen that is generally displayed first in response to the display apparatus being turned on. Although the initial screen is displayed in FIG. 7, a pre-set screen other than the initial screen may be displayed, such as a default screen set in the preferences of the display apparatus 100. A redundant explanation regarding this exemplary embodiment is omitted.

In addition to the exemplary embodiment of the operations explained above with reference to FIG. 7, another exemplary embodiment may be derived by adding and supplementing with various operations explained above with reference to FIGS. 1 to 5C.

In the above-described exemplary embodiments, the recognition information is generated by photographing the user. However, according to another exemplary embodiment, a user's voice may be recognized and recognition information may be generated based on the recognized voice.

The above-described exemplary embodiments are merely for the purpose of understanding the main technical idea of the present inventive concept and the scope of the present inventive concept should not be limited to the exemplary embodiments described above. Any exemplary embodiment corresponding to a display apparatus which can automatically recognize a user in response to a specific command being input and provide content that has been provided to the user before, or a providing method thereof belongs to the scope of the present inventive concept.

The display method of the display apparatus according to the above-described various exemplary embodiments may be coded as software and may be stored in a non-transitory readable medium. The non-transitory readable medium may be mounted and used in various devices.

The non-transitory readable medium refers to a medium that stores data semi-permanently rather than storing data for a very short time, such as a register, a cache, and a memory, and is readable by an apparatus. Specifically, the non-transitory readable medium may be a compact disc (CD), a digital versatile disk (DVD), a Blu-ray disk, a USB, a memory card, a ROM, etc.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for displaying information on a display apparatus, the method comprising:
   in response to a user input that turns off power to the display apparatus being input, photographing a user and generating first recognition information;
   storing the first recognition information in association with information on a screen displayed when the user input that turns off power to the display apparatus is input;
   in response to a user input that turns on power to the display apparatus being input, photographing a user and generating second recognition information;
   determining whether the first recognition information matches the second recognition information; and
   displaying the screen on the display apparatus that is displayed when the user input that turns off power to the display apparatus was input or a screen different from the screen displayed when the user input that turns off power to the display apparatus was input, based on a result of the determination.

2. The method of claim 1, wherein the displaying comprises, when the first recognition information matches the second recognition information, displaying the screen displayed when the user input that turns off power to the display apparatus was input, and, when the first recognition information does not match the second recognition information, displaying a screen that is different from the screen displayed when the user input that turns off power to the display apparatus was input.

3. The method of claim 1, wherein the photographing of the user in response to the user input that turns off power to the display apparatus being input comprises photographing a plurality of users, and the generating the first recognition information comprises generating a plurality of pieces of first recognition information, each piece of first recognition information corresponding to one of the plurality of users, and wherein the displaying comprises, when at least one of the pieces of first recognition information matches the second recognition information, displaying the screen displayed when the user input that turns off power to the display apparatus was input.

4. The method of claim 3, wherein photographing of the user in response to the user input that turns on power to the display apparatus being input comprises photographing a plurality of users, and the generating the second recognition information comprises generating a plurality of pieces of second recognition information, each piece of second recognition information corresponding to one of the plurality of users, and wherein the displaying comprises, when the pieces of first recognition information match the pieces of second recognition information for all of the plurality of users, displaying the screen displayed when the user input that turns off power to the display apparatus was input.

5. The method of claim 1, wherein the user input that turns off power to the display apparatus and the user input that turns on power to the display apparatus are commands generated by pressing a button on a remote controller for controlling the display apparatus.

6. The method of claim 1, wherein the first recognition information and the second recognition information are image information that is obtained by photographing a face of the user.

7. The method of claim 1, wherein the storing comprises updating the stored information on the screen that has been associated with the first recognition information every time the user input that turns off power to the display apparatus is input, and storing the updated information.

8. The method of claim 1, wherein the information on the screen is information on a channel which is being watched, information on an application which is being executed, or information on an operation mode of the display apparatus.

9. A display apparatus comprising:
a display configured to display image data;
a photographer configured to photograph a user;
a storage;
an inputter configured to receive a user command to control the display apparatus; and
a controller configured to, in response to a user input that turns off power to the display apparatus being input through the inputter, control the photographer to photograph a user using the photographer and generate first recognition information, and control the storage to store the first recognition information in association with information on a screen displayed when the user input that turns off power to the display apparatus is input in the display apparatus; and configured to, in response to a user input that turns on power to the display apparatus being input through the inputter, control the photographer to photograph a user using the photographer and generate second recognition information, determine whether the first recognition information matches the second recognition information, and control the display of the display apparatus to display the screen displayed when the user input that turns off power to the display apparatus was input or a screen different from the screen displayed when the user input that turns off power to the display apparatus was input based on a result of the determination.

10. The display apparatus of claim 9, wherein, when the first recognition information matches the second recognition information, the controller displays the screen displayed when the user input that turns off power to the display apparatus was input, and, when the first recognition information does not match the second recognition information, the controller displays a screen which is different than the screen displayed when the user input that turns off power to the display apparatus was input.

11. The display apparatus of claim 9, wherein, in response to the user input that turns off power to the display apparatus being input, the controller controls the photographer to photograph a plurality of users, generates a plurality of pieces of first recognition information, each piece of first recognition information corresponding to one of the plurality of users, and, when at least one of the pieces of first recognition information matches the second recognition information, the controller controls the display to display the screen displayed when the user input that turns off power to the display apparatus was input.

12. The display apparatus of claim 11, wherein, in response to the user input that turns on power to the display apparatus being input, the controller controls the photographer to photograph a plurality of users generates a plurality of pieces of second recognition information, each piece of second recognition information corresponding to one of the plurality of users, and, when the pieces of first recognition information match the pieces of second recognition information for all of the plurality of users, the controller controls the display to display the screen displayed when the user input that turns off power to the display apparatus was input.

13. The display apparatus of claim 9, wherein the user input that turns off power to the display apparatus and the user input that turns on power to the display apparatus are commands generated by pressing a button on a remote controller for controlling the display apparatus.

14. The display apparatus of claim 9, wherein the first recognition information and the second recognition information are image information that is obtained by photographing a face of the user.

15. The display apparatus of claim 9, wherein the controller updates the stored information on the screen that has been associated with the first recognition information every time the user input that turns off power to the display apparatus is input, and stores the updated information.

16. The display apparatus of claim 9, wherein the information on the screen is information on a channel which is being watched, information on an application which is being executed, or information on an operation mode of the display apparatus.

17. A method comprising:
in response to receiving a user input to the display apparatus at a display apparatus, the user input turning off power to the display apparatus:
capturing a physical feature of a user; and
generating first recognition information from the captured physical feature;
storing, in the display apparatus, the first recognition information in association with a state of the display apparatus, wherein the state of the display apparatus is a state of the display apparatus at a time the user input that turns off power to the display apparatus is received;
in response to receiving a user input at the display apparatus, the user input turning on power to the display apparatus:
capturing a physical feature of a user; and generating second recognition information from the captured physical feature;

determining whether the stored first recognition information matches the generated second recognition information; and displaying, at the display apparatus, a screen corresponding to the state associated with the first recognition information or a screen that is different from the screen corresponding the state associated with the first recognition information based on a result of the determination.

18. The method of claim 17, wherein the state of the display apparatus is a screen which is being displayed, a channel which is being watched, a state of an application which is being executed, or an operation mode in which the display apparatus is being operated.

\* \* \* \* \*